A. KÖNIG.
TELEMETER.
APPLICATION FILED JAN. 4, 1909.

1,000,609.

Patented Aug. 15, 1911.

Witnesses:
Paul Krüger
Fritz Sander

Inventor:
Albert König

UNITED STATES PATENT OFFICE.

ALBERT KÖNIG, OF JENA, GERMANY, ASSIGNOR TO THE FIRM OF CARL ZEISS, OF JENA, GERMANY.

TELEMETER.

1,000,609.  Specification of Letters Patent.  Patented Aug. 15, 1911.

Application filed January 4, 1909. Serial No. 470,596.

*To all whom it may concern:*

Be it known that I, ALBERT KÖNIG, a citizen of the German Empire, and residing at Carl-Zeiss strasse, Jena, in the Grand Duchy of Saxe-Weimar, Germany, have invented a new and useful Telemeter, of which the following is a specification.

The invention relates to stereoscopic telemeters, traveling mark telemeters as well as fixed scale telemeters. Its object is to give each of the two telescopes of such a telemeter the advantageous property, that all of its optical parts, not only those lying behind the image field, can change their position, without the object image and the component measuring mark system becoming displaced in the image field relatively to each other and the instrument being therefore deranged. This end is attained by employing for each component measuring mark system a real optical image, in which a distant virtual mark image lying in the direction toward the object is reproduced by the same parts of the telescope which also project the object image. In consequence of this arrangement any change in the position of one of these parts influences the component measuring mark system and the object image in exactly the same manner and does therefore in no way alter their relative position. In order to produce the two distant virtual mark images, a collimating system and a reflecting system are located in front of the telescopes.

The collimating system may be realized by a single collimator, that is to say, a combination of a collective lens and a mark system arranged in the focal plane of this lens. Such a single collimator, connected with both telescopes by means of an appropriate prism system, removes a further cause of derangement of the instrument, so far as a change in the direction of the collimator axis produces in fact still a displacement of the component measuring mark system relatively to the object image, but always exactly the same in both image fields.

In the case of a separate collimator being provided for each telescope, a similar protection against derangement can be obtained, if the mark of the one collimator be placed on or near to the collective lens of the other, and inversely. Both collimator axes can then only change their directions simultaneously and in exactly the same manner, so that again only an identical displacement of both component measuring mark systems relatively to the object images can result.

Figure 1:
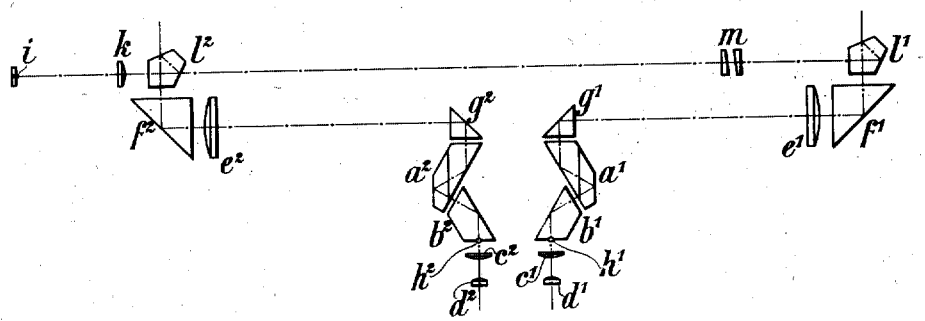
Figure 2:
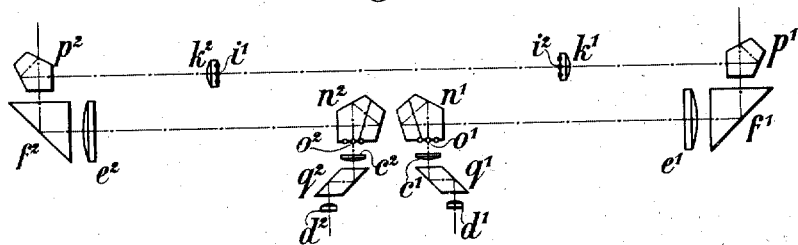
Figure 3:
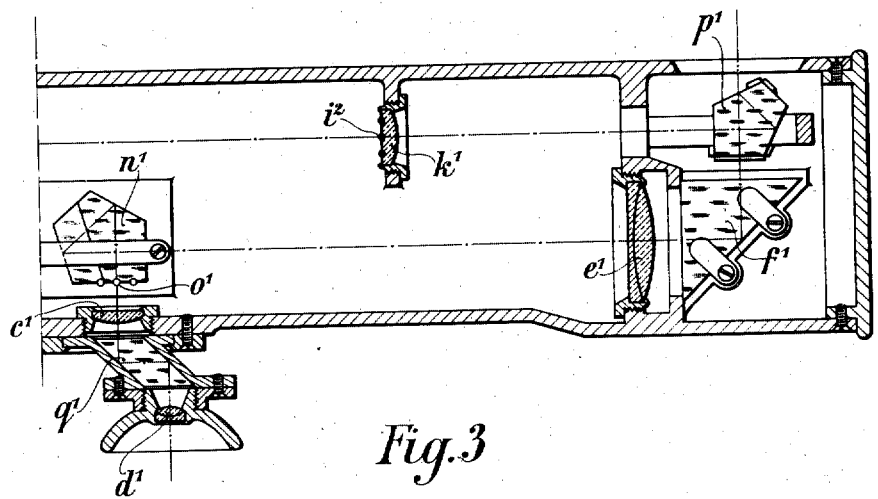

In the annexed drawing: Figure 1 is the plan view of the optical parts of a stereoscopic telemeter with traveling mark. Fig. 2 is the plan view of the optical parts of a stereoscopic telemeter with fixed scale. Fig. 3 is a horizontal section through the right half of a stereoscopic telemeter with fixed scale according to Fig. 2, the left half being exactly symmetrical to the right one.

In the telemeter according to Fig. 1 the two object images lie in the hindmost surfaces of the image-erecting prism systems $a^1 b^1$ and $a^2 b^2$, which are rigidly connected with the oculars $c^1 d^1$ and $c^2 d^2$, but are rotatable about their own entrance axes, so that by virtue of their eccentricity the distance between the oculars can be adapted to the interpupillary distance. The objectives $e^1$ and $e^2$ of the telescopes are placed between simple reflecting prisms $f^1 g^1$ and $f^2 g^2$. The component marks $h^1$ and $h^2$ in the image fields are both real images and both derived from the collimator $i\ k$. To accomplish this, two small optical square prisms $l^1$ and $l^2$ are arranged, one in line with the upper and the other in line with the lower half of the collective lens $k$. These prisms give the object directions, proper to the left and to the right telescope, to the distant virtual mark images produced by the collimator halves. Measurement, as is well known, is taken by making the stereoscopic mark travel until it lies in the same apparent depth as the object point. To this end a well-known system $m$ of two rotatable glass wedges is placed between the collimator and the prism $l^1$. Through the micrometrical movement of $m$ the distant virtual mark image of the right telescope, hence also its real reproduction, the component $h^1$ of the stereoscopic mark, is shifted.

In Fig. 2 the ocular prisms $n^1$ and $n^2$ are optical square prisms with ridges. In their hinder surfaces, being the image planes of the oculars, the components $o^1$ and $o^2$ of the stereoscopic scale are presented by real optical images produced in the following way: The collimators $i^1 k^1$ and $i^2 k^2$ are united, by fixing the object scales $i^2$ and $i^1$ on the collective lenses $k^1$ and $k^2$, into a double collimator, the two axes of which have an invariable position to one another. The two distant virtual images of the object scales $i^2$ and $i^1$ are brought by two small optical square prisms $p^1$ and $p^2$ into the object direction proper to each telescope. The oculars are rendered eccentric by prisms $q^1$ and $q^2$ and can therefore be adjusted to the inter-pupillary distance by rotating them about the axes of the field lenses $c^1$ and $c^2$.

As in the construction of Fig. 3 the optical parts of Fig. 2 are employed, this figure needs no further explanation.

I claim:

1. A stereoscopic telemeter comprising two telescopes, neither of which is filled with a measuring mark system, a collimating system and a reflecting prism system, these two systems being located in front of the telescopes and adapted to produce together two distant virtual mark system images, one in the object direction of each telescope.

2. A stereoscopic telemeter comprising two telescopes, neither of which is filled with a measuring mark system, two collimators and two reflecting prisms, these four being located in front of the telescopes, each collimator consisting of a collective lens and an object mark system arranged on the collective lens of the other collimator, one collimator and one reflecting prism being adapted to produce together a distant virtual mark system image in the object direction of one telescope, the other collimator and the other reflecting prism being adapted to produce together a distant virtual mark system image in the object direction of the other telescope.

ALBERT KÖNIG.

Witnesses:
PAUL KRÜGER,
FRITZ SANDER.